United States Patent
Umeda

(10) Patent No.: US 11,480,979 B2
(45) Date of Patent: Oct. 25, 2022

(54) TRANSPORT OPERATION CONTROL APPARATUS AND TRANSPORT OPERATION CONTROL METHOD

(71) Applicant: TOYOTA JIDOSHA KABUSHIKI KAISHA, Toyota (JP)

(72) Inventor: Kazuhiro Umeda, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 16/729,673

(22) Filed: Dec. 30, 2019

(65) Prior Publication Data
US 2020/0272172 A1 Aug. 27, 2020

(30) Foreign Application Priority Data
Feb. 27, 2019 (JP) .............................. JP2019-034342

(51) Int. Cl.
*G05D 1/02* (2020.01)
*G07C 5/08* (2006.01)

(52) U.S. Cl.
CPC ......... *G05D 1/0291* (2013.01); *G05D 1/0212* (2013.01); *G07C 5/0816* (2013.01); *G05D 2201/0213* (2013.01)

(58) Field of Classification Search
CPC ............... G05D 1/0212; G05D 1/0287; G05D 1/0291–0297; G05D 2201/0213;
(Continued)

(56) References Cited

U.S. PATENT DOCUMENTS

| 5,739,774 A | * | 4/1998 | Olandesi | ................ G08G 1/123 |
| | | | | 340/991 |
| 10,948,927 B1 | * | 3/2021 | Harris | ...................... G08G 1/22 |
| 2014/0197967 A1 | * | 7/2014 | Modica | ............ G08G 1/096775 |
| | | | | 340/932 |

FOREIGN PATENT DOCUMENTS

| CN | 104575059 A | 4/2015 |
| CN | 106448139 A | 2/2017 |

(Continued)

OTHER PUBLICATIONS

U.S. Appl. No. 16/778,615, filed Jan. 31, 2020, Umeda, K.
(Continued)

*Primary Examiner* — Aaron L Troost
(74) *Attorney, Agent, or Firm* — Oblon, McClelland, Maier & Neustadt, L.L.P.

(57) ABSTRACT

The disclosure relates to a transport operation control method and apparatus. The method includes determining to interchange a vehicle to be changed selected among a plurality of vehicles with a vehicle for replacement, transmitting an instruction such that the vehicle for replacement travels a circuit between the vehicle to he changed and a vehicle traveling behind, and transmitting an instruction such that over a time period from the vehicle for replacement starting traveling on the path until finishing one lap of the path, In the method, a time interval at which each of all remaining vehicles other than the vehicle to be changed among the plurality of vehicles and the vehicle for replacement passes an arbitrary point on the path becomes approximately constant. The method further includes instructing the vehicle to be changed to leave the path after the vehicle for replacement finishes the lap of the path.

6 Claims, 7 Drawing Sheets

(58) Field of Classification Search
CPC ........ G07C 5/0816; G08G 1/00; G08G 1/127; G08G 1/0145; G08G 1/123; G08G 1/0968–0969
See application file for complete search history.

(56) References Cited

FOREIGN PATENT DOCUMENTS

| | | |
|---|---|---|
| JP | 2000-264210 A | 9/2000 |
| JP | 2005-222144 A | 8/2005 |

OTHER PUBLICATIONS

U.S. Appl. No. 16/790,805, filed Feb. 14, 2020, Umeda, K.
U.S. Appl. No. 16/806,301, filed Mar. 2, 2020, Umeda, K.
U.S. Appl. No. 16/807,314, filed Mar. 3, 2020, Umeda, K.

* cited by examiner

TRANSPORT OPERATION CONTROL APPARATUS AND TRANSPORT OPERATION CONTROL METHOD

INCORPORATION BY REFERENCE

The disclosure of Japanese Patent Application No. 2019-034342 filed on Feb. 27, 2019 including the specification, drawings and abstract is incorporated herein by reference in its entirety.

BACKGROUND

1. Technical Field

The present disclosure relates to a transport operation control apparatus and a transport operation control method.

2. Description of Related Art

In recent years, research and development on automatic operation of vehicles such as automobiles or trains have been conducted. With such a trend of technical development as a backdrop, the Ministry of Land, Infrastructure, Transport and Tourism carries out test traveling of buses in automatic operation on public roads and pursues study on the future of urban traffic, including verification of the effects of automatic operation technology, necessity of an infrastructure to advance automatic operation of buses, and the like. With such situations as a backdrop, Japanese Patent Application Publication No. 2005-222144 A proposes an automatic transport operation assistance system that optimizes bus service intervals while averaging degrees of bus congestion based on information on the occupancy, speed, and position of each bus traveling on a route.

SUMMARY

However, in JP 2005-222144 A, it is not considered how a bus traveling on a route is interchanged with another bus while bus service intervals are maintained, and a disturbance may be caused in the bus service intervals, depending on a method of interchanging buses.

Accordingly, an object of the present disclosure is to interchange vehicles without causing a disturbance in a time interval at which each of a plurality of vehicles passes an arbitrary point on a path.

To achieve the object, a transport operation control apparatus according to the present disclosure is a transport operation control apparatus that controls transport operation of a plurality of vehicles traveling a circuit along a predetermined path, including: a first instructor that transmits an instruction for transport operation to each vehicle such that a time interval at which each of the plurality of vehicles passes an arbitrary point on the path becomes approximately constant; a determiner that selects any one or more vehicles among the plurality of vehicles as one or more vehicles to be changed and determines to interchange the one or more vehicles to be changed with as many vehicles for replacement as the number of the one or more vehicles to be changed; a second instructor that transmits an instruction to each of the one or more vehicles for replacement such that the vehicle for replacement travels a circuit along the path between a corresponding one of the one or more vehicles to be changed and a vehicle traveling ahead of the corresponding vehicle to be changed, or between the corresponding vehicle to be changed and a vehicle traveling behind the corresponding vehicle to be changed; a third instructor that transmits an instruction for transport operation to each of all remaining vehicles other than the one or more vehicles to be changed among the plurality of vehicles and each of the one or more vehicles for replacement such that over a time period from when each of the one or more vehicles for replacement starts traveling on the path until the vehicle for replacement finishes one lap of the path, a time interval at which each of all the remaining vehicles and the one or more vehicles for replacement passes an arbitrary point on the path becomes approximately constant; and a fourth instructor that instructs each of the one or more vehicles to be changed to leave the path after a corresponding one of the one or more vehicles for replacement finishes the one lap of the path. With the transport operation control apparatus according to the present disclosure, it is possible to interchange vehicles without causing a disturbance in a time interval at which each of a plurality of vehicles passes an arbitrary point on a path.

Here, the third instructor may transmit an instruction for transport operation to each of the one or more vehicles to be changed such that a time interval at which the vehicle to be changed and vehicles traveling ahead of and behind the vehicle to be changed pass an arbitrary point on the path becomes approximately constant. Thus, even when a vehicle to be changed and a vehicle for replacement temporarily coexist and a plurality of vehicles travel on a path, time intervals between two consecutive vehicles can be made as equal as possible.

A transport operation control method according to the present disclosure includes: by a transport operation control apparatus that controls transport operation of a plurality of vehicles traveling a circuit along a predetermined path, transmitting an instruction for transport operation to each vehicle such that a time interval at which each of the plurality of vehicles passes an arbitrary point on the path becomes approximately constant; selecting any one or more vehicles among the plurality of vehicles as one or more vehicles to be changed and determining to interchange the one or more vehicles to be changed with as many vehicles for replacement as the number of the one or more vehicles to be changed; transmitting an instruction to each of the one or more vehicles for replacement such that the vehicle for replacement travels a circuit along the path between a corresponding one of the one or more vehicles to be changed and a vehicle traveling ahead of the corresponding vehicle to be changed, or between the corresponding vehicle to be changed and a vehicle traveling behind the corresponding vehicle to be changed; transmitting an instruction for transport operation to each of all remaining vehicles other than the one or more vehicles to be changed among the plurality of vehicles and each of the one or more vehicles for replacement such that over a time period from when each of the one or more vehicles for replacement starts traveling on the path until the vehicle for replacement finishes one lap of the path, a time interval at which each of all the remaining vehicles and the one or more vehicles for replacement passes an arbitrary point on the path becomes approximately constant; and instructing each of the one or more vehicles to be changed to leave the path after a corresponding one of the one or more vehicles for replacement finishes the one lap of the path. By the transport operation control method according to the present disclosure, it is possible to interchange vehicles without causing a disturbance in a time interval at which each of a plurality of vehicles passes an arbitrary point on a path.

According to the present disclosure, it is possible to interchange vehicles without causing a disturbance in a time interval at which each of a plurality of vehicles passes an arbitrary point on a path.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
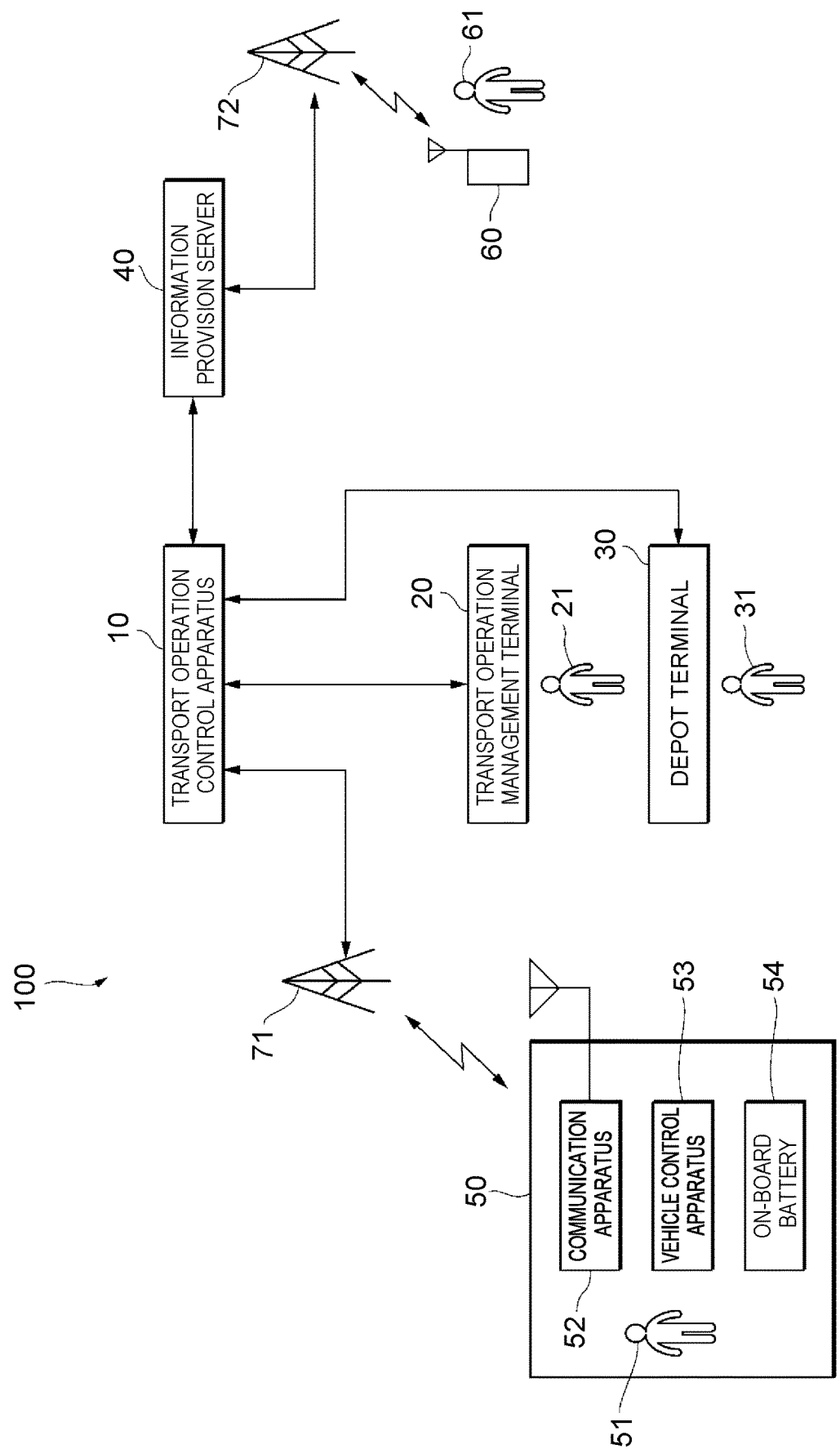
FIG. 1 is an illustrative diagram showing a schematic configuration of a transport operation management system according to an embodiment of the present disclosure.

Hereinafter, an embodiment of the present disclosure will be described with reference to the drawings. Here, like numerals denote like elements, and an overlapping description will be omitted. FIG. 1 is an illustrative diagram showing a schematic configuration of a transport operation management system 100 according to the embodiment of the present disclosure. The transport operation management system 100 manages and controls scheduled transport operation of a vehicle 50 that travels a circuit along a predetermined path. The vehicle 50 includes shared automobiles and trains. The shared automobiles are automobiles that carry many and unspecified passengers and travel along predetermined paths, and include buses (for example, shared buses, regular route buses) and taxies (for example, shared taxies). The trains are railway vehicles that travel along predetermined paths in order to transport people or things. A train may be a single-car train. The vehicle 50 is, for example, an electric vehicle that obtains driving force by driving a motor through consumption of electricity supplied from an on-board battery 54.

The transport operation management system 100 includes a transport operation control apparatus 10, a transport operation management terminal 20, a depot terminal 30, and an information provision server 40. The transport operation control apparatus 10 manages states of a plurality of the vehicles 50 (for example, transport operation states, states-of-charge of the respective on-board batteries 54, and the like), and controls scheduled transport operation of each vehicle 50. The transport operation state of the vehicle 50 indicates whether or not the vehicle 50 is operating as scheduled, or whether or not the vehicle 50 is charging the battery in a depot, for example, and indicates a position and a speed of the vehicle 50 when the vehicle 50 is operating. The state-of-charge of the vehicle 50 indicates, for example, a charged capacity of the on-board battery 54 of the vehicle 50 and presence or absence of an abnormality in charge. The transport operation management terminal 20 receives an instruction for transport operation of the vehicle 50 from a transport operation manager 21 who monitors the transport operation of the vehicle 50. For example, when an abnormality occurs, the transport operation manager 21 can instruct all or some of a plurality of the vehicles 50 that are traveling a circuit along the predetermined path to stop. The instruction for transport operation of the vehicle 50 from the transport operation manager 21 is input to the transport operation control apparatus 10 via the transport operation management terminal 20.

The transport operation control apparatus 10 controls the transport operation of each vehicle 50 based on a transport operation schedule prepared in advance, or based on an instruction for transport operation of the vehicle 50 input from the transport operation management terminal 20. The depot terminal 30 receives an instruction about entrance of the vehicle 50 into or exit of the vehicle 50 from the depot from the transport operation control apparatus 10. A maintainer 31 allows the vehicle 50 to enter or exit the depot in accordance with the instruction received by the depot terminal 30. The depot terminal 30 is, for example, a personal computer or a tablet terminal including a communication function. The information provision server 40 receives transport operation information on the vehicle 50 (for example, an estimated time of arrival at each station, and the like) from the transport operation control apparatus 10 and provides the received transport operation information. The information provision server 40 is, for example, a web server that provides such transport operation information described in hypertext markup language.

The transport operation control apparatus 10 is connected to the transport operation management terminal 20, the depot terminal 30, and the information provision server 40 through, for example, a wired network. The instruction for transport operation of the vehicle 50 from the transport operation control apparatus 10 is wirelessly transmitted to the vehicle 50 via a base station 71. The transport operation information on the vehicle 50 from the information provision server 40 is transmitted to a communication terminal 60 of a user 61 via a base station 72. The communication terminal 60 is, for example, a mobile communication terminal (a smartphone, a smartwatch, a tablet terminal, or the like) or a personal computer including a communication function. The user 61 can board the vehicle 50 after checking the transport operation information on the vehicle 50 on the communication terminal 60. The user 61 being on board the vehicle 50 is referred to as passenger.

The vehicle 50 includes a communication apparatus 52, a vehicle control apparatus 53, and the on-board battery 54. The communication apparatus 52 transmits and receives information related to control of the transport operation of the vehicle 50 to/from the transport operation control apparatus 10. For example, the communication apparatus 52 receives an instruction for transport operation of the vehicle 50 from the transport operation control apparatus 10. For example, the communication apparatus 52 transmits information indicating a state of the vehicle 50 (for example, a transport operation state, a state-of-charge of the on-board battery 54, or the like) to the transport operation control apparatus 10. The vehicle control apparatus 53 controls operation of the vehicle 50 by switching among a plurality of operation modes (for example, an automatic mode, a semi-automatic mode, a manual mode, and a stop mode). The automatic mode is a mode in which the vehicle 50 automatically operates by responding to an instruction from the transport operation control apparatus 10. The semi-automatic mode is a mode in which the vehicle 50 autonomously operates without receiving an instruction from the transport operation control apparatus 10. The manual mode is a mode in which an on-board operator 51 of the vehicle 50 operates the vehicle 50 through manual operation. The stop mode is a mode in which operation of the vehicle 50 is stopped.

The vehicle control apparatus 53 includes, for example, a shooting apparatus (for example, a stereo camera) that shoots situations on the front, rear, right, and left sides of the vehicle 50, a locating apparatus (for example, a global positioning system) that detects positional information on the vehicle 50, sensors (for example, millimeter-wave radars) that detect presence or absence of an obstacle around the vehicle 50, an electronic control unit that controls output of the vehicle 50, an electronic control unit that controls a steering angle of the vehicle 50, and an electronic control unit that controls braking of the vehicle 50.

Figure 2:
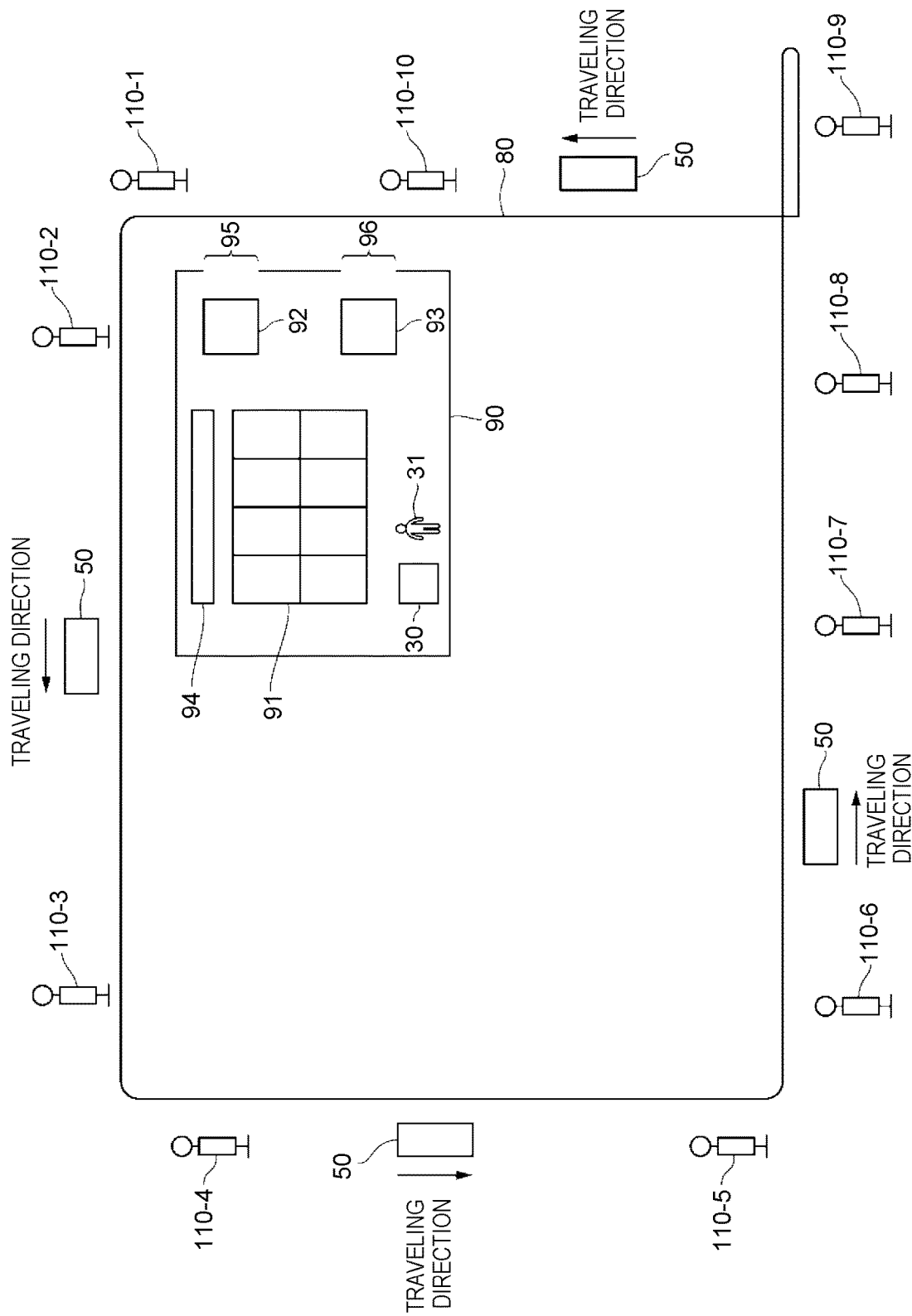
FIG. 2 is an illustrative diagram showing a schematic configuration of a path and a depot according to the embodiment of the present disclosure.

FIG. 2 is an illustrative diagram showing a schematic configuration of a path 80 and a depot 90 according to the embodiment of the present disclosure. The depot 90 includes a parking section 91 sectioned such that a plurality of the vehicles 50 are parked, a waiting section 92 sectioned such that the vehicle 50 can wait to move from the depot 90 to the path 80, a waiting section 93 sectioned such that the vehicle 50 can wait to move from the path 80 to the depot 90, and a charging facility 94 that charges the on-board battery 54 of the vehicle 50. The waiting section 92 is provided near an exit 95 of the depot 90. The waiting section 93 is provided near an entrance 96 of the depot 90. Control of automatic operation of the vehicle 50 by the transport operation control apparatus 10 starts at a time point when the vehicle 50 starts traveling from the waiting section 92 toward the path 80, and ends at a time point when the vehicle 50 returns from the path 80 and stops at the waiting section 93. The depot terminal 30 is provided to the depot 90. When the depot terminal 30 receives an instruction for exit from the depot from the transport operation control apparatus 10, the maintainer 31 moves the vehicle 50 from the parking section 91 to the waiting section 92 (exit from the depot) through manual operation. When the depot terminal 30 receives an instruction for entrance into the depot from the transport operation control apparatus 10, the maintainer 31 moves the vehicle 50 from the waiting section 93 to the parking section 91 (entrance into the depot) through manual operation. While each vehicle 50 is parked in the parking section 91, the vehicle 50 can charge the on-board battery 54 by receiving electricity supplied from the charging facility 94.

The path 80 is raid out in a closed curve shape such that a plurality of the vehicles 50 can travel a circuit. When the vehicle 50 is a shared automobile, the path 80 is a road. In a road including a plurality of lanes, the path 80 means a lane on which the vehicle 50 travels. When the vehicle 50 is a train, the path 80 is a rail. One or more stations 110 are set on the path 80. Each vehicle 50 stops at each station 110 and opens and closes a door, regardless of whether or not a passenger gets on or gets off. Although the example shown in FIG. 2 illustrates a case where the number of the stations 110 is ten for convenience of explanation, the number of the stations 110 is not limited to ten. If it is not particularly necessary to distinguish the stations from each other, the stations are collectively referred to as station 110. If it is necessary to distinguish the stations from each other, the stations are referred to as station 110-1, 110-2, . . . , 110-10. Among the stations 110, particularly the station 110-1 closest to the exit 95 of the depot 90 is referred to as "farthest station", and the station 110-10 closest to the entrance 96 of the depot 90 is referred to as "closest station".

Note that the transport operation control apparatus 10 adjusts the number of the vehicles 50 that are traveling a circuit along the path 80, based on the transport operation schedule. For example, the number of the vehicles 50 that are traveling a circuit along the path 80 may be reduced in off-hours during which there are a smaller number of passengers, and the number of the vehicles 50 that are traveling a circuit along the path 80 may be increased in busy hours during which there are a larger number of passengers. For example, the transport operation control apparatus 10 may transmit an instruction to the depot terminal 30 such that any vehicle 50 having a charged capacity less than a threshold value, among a plurality of the vehicles 50 that are traveling on the path 80, enters the depot 90. For example, the transport operation control apparatus 10 may transmit an instruction to the depot terminal 30 such that any vehicle 50 having a charged capacity not less than the threshold value, among a plurality of the vehicles 50 that are parked in the depot 90, travels on the path 80. The transport operation control apparatus 10 can adjust the number of the vehicles 50 that are traveling a circuit along the path 80 by appropriately making an interchange between the vehicle 50 that is traveling on the path 80 and the vehicle 50 that is parked in the depot 90.

Figure 3:
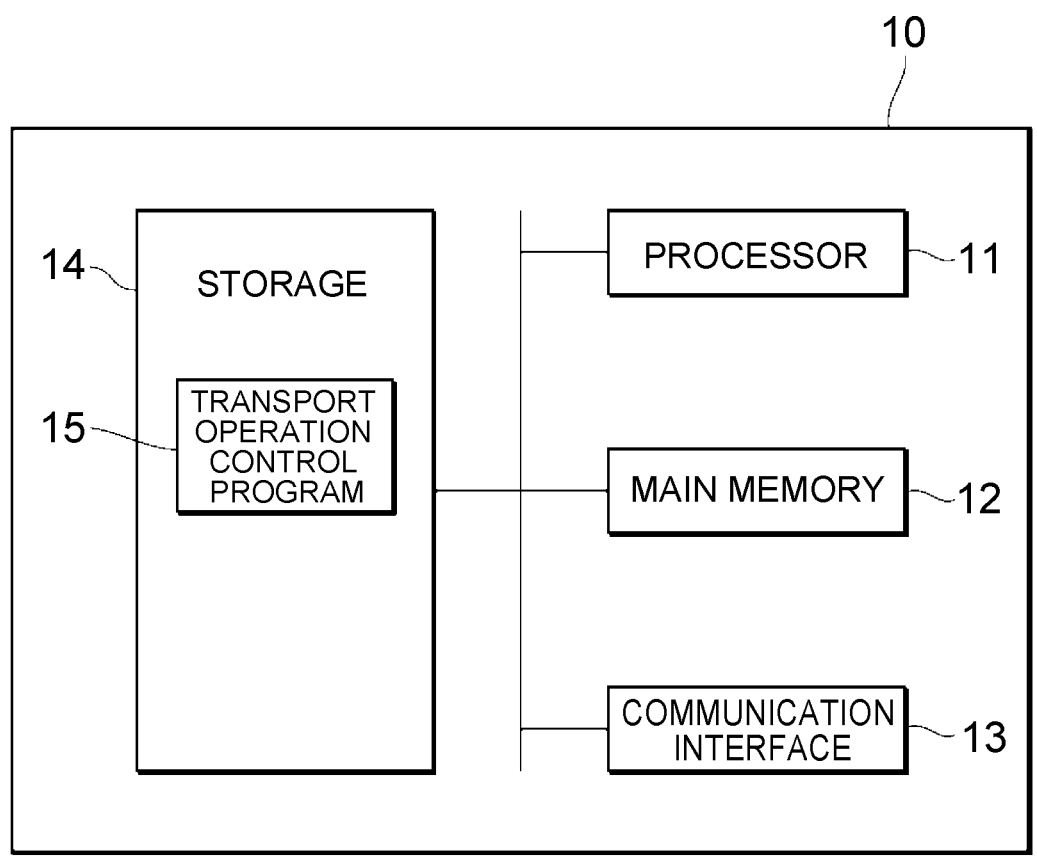
FIG. 3 is an illustrative diagram showing a hardware configuration of a transport operation control apparatus according to the embodiment of the present disclosure.

FIG. 3 is an illustrative diagram showing a hardware configuration of the transport operation control apparatus 10 according to the embodiment of the present disclosure. The transport operation control apparatus 10 includes a processor 11, a main memory 12, a communication interface 13, and a storage 14. The storage 14 is a computer-readable recording medium such as a disk medium (for example, a magnetic recording medium or a magneto-optical recording medium) or a semiconductor memory (for example, a volatile memory or a nonvolatile memory). Such a recording medium can also be referred to as, for example, a non-transient recording medium. The storage 14 stores a transport operation control program 15 that controls the transport operation of the vehicle 50. The transport operation control program 15 is read from the storage 14 into the main memory 12 and interpreted and executed by the processor 11, whereby a transport operation control method according to the embodiment is executed. Note that the communication interface 13 controls communication between the transport operation control apparatus 10 and the other end of the communication (the vehicle 50, the transport operation management terminal 20, the depot terminal 30, the information provision server 40).

Next, the transport operation control method according to the embodiment will be described with reference to FIGS. 4 to 9. Each vehicle 50 periodically transmits own positional information to the transport operation control apparatus 10, and the transport operation control apparatus 10 keeps track of the positional information on each vehicle 50. The transport operation control apparatus 10 transmits an instruction for transport operation to each vehicle 50 such that a time interval at which each of a plurality of the vehicles 50 passes an arbitrary point on the path 80 becomes approximately constant. Thus, each vehicle 50 can arrive at each station 110 at the constant time interval. The time interval thus adjusted to be approximately constant corresponds to a time period obtained by a time period required for the vehicle 50 to travel one lap of the path 80 divided by the number of the vehicles 50 that are traveling on the path 80, and is referred to as "standard vehicle time interval". Processing of controlling the transport operation of each vehicle 50 such that a time interval at which each of a plurality of the vehicles 50 passes the arbitrary point on the path 80 becomes equal to the standard vehicle time interval is referred to as "time interval equalization processing". In the present description, a time interval between two vehicles means a time period required from when one of the two vehicles passes an arbitrary point until the other vehicle passes the arbitrary point.

Note that in the off-hours during which there are a smaller number of passengers, the standard vehicle time interval is longer because the number of the vehicles 50 that are traveling on the path 80 is reduced. In contrast, in the busy hours during which there are a larger number of passengers, the standard vehicle time interval is shorter because the number of the vehicle 50 that are traveling on the path 80 is increased.

Figure 4:
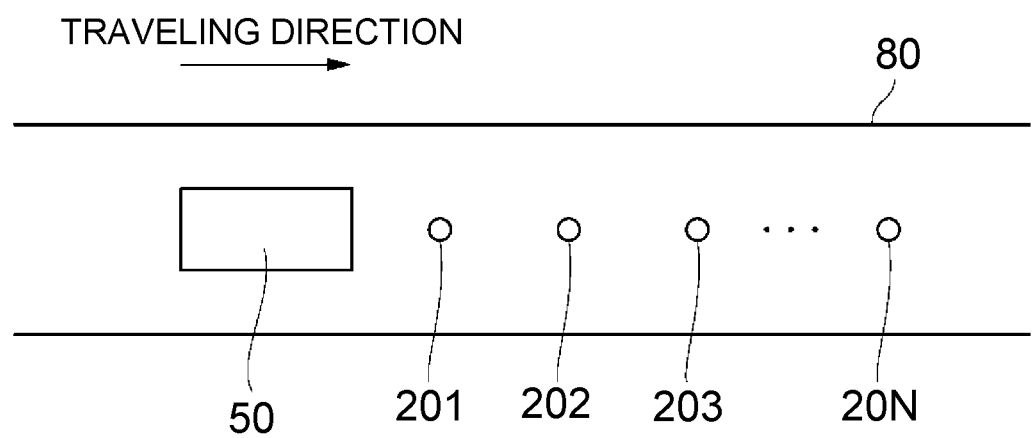
FIG. 4 is an illustrative diagram of a transport operation control method according to the embodiment.

Here, the time interval equalization processing will be described with reference to FIG. 4. Reference signs 201, 202, 203, . . . , 20N represent desired arrival positions of the vehicle 50 at different designated times. For example, reference sign 201 represents a desired arrival position of the vehicle 50 at designated time t0. Reference sign 202 represents a desired arrival position of the vehicle 50 at designated time (t0+t).

Reference sign 203 represents a desired arrival position of the vehicle 50 at designated time (t0+2t). Reference sign 20N represents a desired arrival position of the vehicle 50 at designated time {t0+(N−1)t}. Here, N is an integer not smaller than 2. For example, N may be 10. Time t0 is a time at which a time period t has passed since the present time. The time period t is an arbitrary time period. For example, the time period t may be one second. The desired arrival positions of the vehicle 50 at designated time t0, (t0+t), (t0+2t), . . . , {t0+(N−1)t} are calculated such that the time interval at which each of a plurality of the vehicles 50 passes the arbitrary point on the path 80 becomes equal to the standard vehicle time interval. The transport operation control apparatus 10 transmits the desired arrival positions of the vehicle 50 at designated time t0, (t0+t), (t0+2t), . . . , {t0+(N−1)t} as an instruction for transport operation to the vehicle 50.

The vehicle 50 having received the desired arrival positions as an instruction for transport operation adjusts speed such that the vehicle 50 can arrive at the desired arrival positions at the designated times. A steady speed and a maximum speed of the vehicle 50 are predetermined. The steady speed is, for example, 10 km/h, and the maximum speed is, for example, 19 km/h. When the vehicle 50 cannot arrive at a desired arrival position at a corresponding designated time at the steady speed, the vehicle 50 may accelerate within a safely accelerable range. When the distance of the vehicle 50 to a vehicle ahead is shorter than a threshold value even if the vehicle 50 can arrive at a desired arrival position at a corresponding designated time at the steady speed, the vehicle 50 may travel at a lower speed. The vehicle 50 does not necessarily need to arrive at each desired arrival position at each corresponding designated time, and may travel at a speed at which the vehicle 50 can safely travel.

Note that the standard vehicle time interval is changed in some cases, depending on an increase or a decrease in the number of the vehicles 50 that are traveling on the path 80. In such a case, each vehicle 50 may cancel an instruction for transport operation received before the standard vehicle time interval is changed, and may travel in accordance with an instruction for transport operation received after the standard vehicle time interval is changed. When a desired arrival position of the vehicle 50 at a corresponding designated time is located behind the current position of the vehicle 50 in a traveling direction, the vehicle 50 may gradually decelerate without abruptly stopping or traveling backward.

Figure 5:
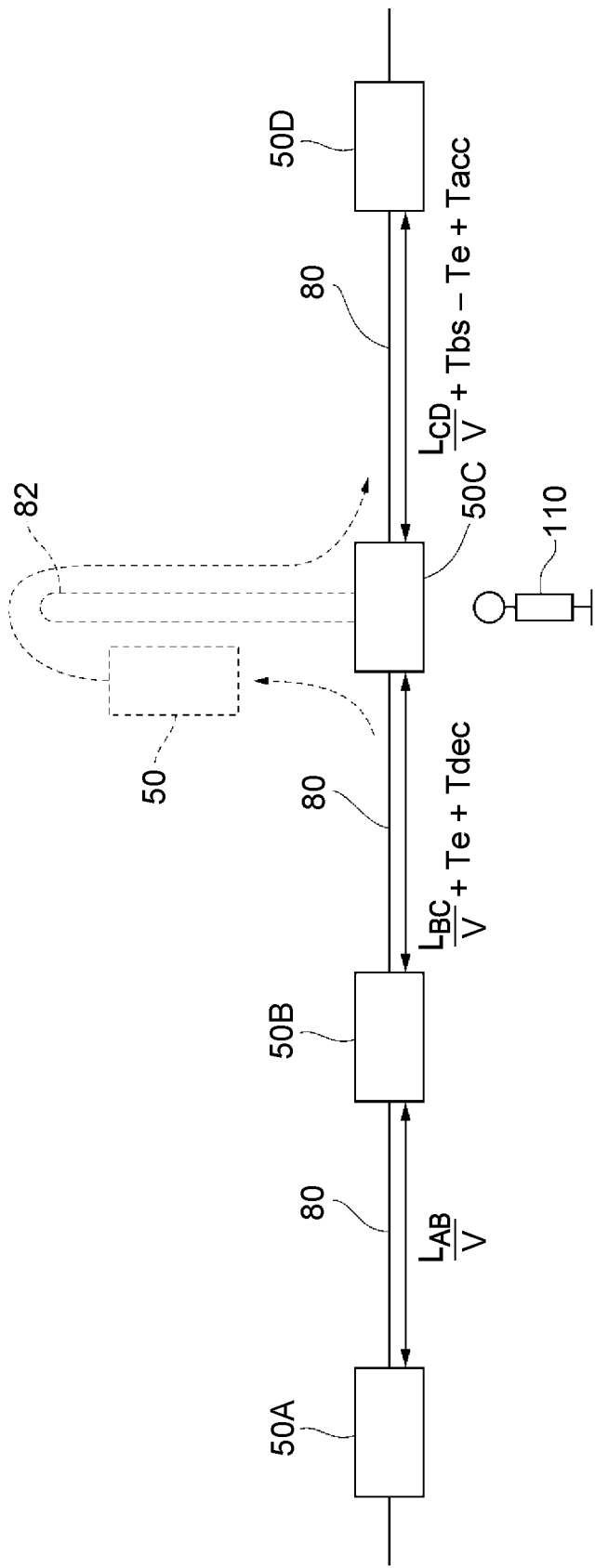
FIG. 5 is an illustrative diagram of the transport operation control method according to the embodiment.

Next, a detailed description will be added to the standard vehicle time interval with reference to FIG. 5. For convenience of explanation, when four vehicles 50 that are traveling on the path 80 are distinguished from each other, the vehicles 50 are referred to as vehicle 50A, vehicle 50B, vehicle 50C, and vehicle 50D. When the four vehicles 50 are not distinguished from each other, the vehicles 50 are collectively referred to as vehicle 50. The length of one lap of the path 80 is assumed to be L. The steady speed of the vehicle 50 is assumed to be V. The number of the vehicles 50 that are traveling on the path 80 is assumed to be Nv. In the example shown in FIG. 5, Nv=4. A mean time period for which the vehicle 50 stops at a station 110 is assumed to be Tbs. An actual time period for which the vehicle 50 stops at a station 110 is assumed to be Te. A time period required for the speed of the vehicle 50 to become zero from the steady speed by the vehicle 50 decelerating in order to stop at a station 110 is assumed to be Tdec. A time period required for the speed of the vehicle 50 to become the steady speed from zero after the vehicle 50 departs from a station 110 is assumed to be Tacc. The distance between the vehicle 50A and the vehicle 50B is assumed to be $L_{AB}$. The distance between the vehicle 50B and the vehicle 50C is assumed to be $L_{BC}$. The distance between the vehicle 50C and the vehicle 50D is assumed to be $L_{CD}$. Note that it is assumed that an imaginary extended path 82 is extended from each station 110, and that the vehicle 50 virtually continues traveling on the extended path 82 at the steady speed while the vehicle 50 stops at a station 110. The length of the extended path 82 is Tbs×V.

The time interval between the vehicle 50A and the vehicle 50B is $L_{AB}$÷V. The time interval between the vehicle 50B and the vehicle 50C is $L_{BC}$÷V+Te+Tdec. The time interval between the vehicle 50C and the vehicle 50D is $L_{CD}$÷V+Tbs−Te+Tacc.

The sum of Tbs at all stations 110 on the path 80 is assumed to be σ1. The sum of Tdec at all stations 110 on the path 80 is assumed to be σ2. The sum of Tacc at all stations 110 on the path 80 is assumed to be σ3. The standard vehicle time interval is assumed to be Ts. In such a case, Ts=(L÷V+σ1+σ2+σ3)÷Nv.

Here, attention will be focused on the vehicle 50B among the plurality of vehicles 50, and it is assumed that the time interval between the vehicle 50C traveling ahead of the vehicle 50B and the vehicle 50B is Tf and the time interval between the vehicle 50A traveling behind the vehicle 50B and the vehicle 50B is Tb. When Tf≥Ts and when Tb≥Ts, the transport operation control apparatus 10 transmits an instruction for transport operation to the vehicle 50B such that the vehicle 50B can arrive at a desired arrival position at a designated time while maintaining the steady speed. Similarly, when Tf<Ts and when Tb<Ts, the transport operation control apparatus 10 transmits an instruction for transport operation to the vehicle 50B such that the vehicle 50B can arrive at the desired arrival position at the designated time while maintaining the steady speed. In contrast, when Tf≥Ts and when Tb<Ts, the transport operation control apparatus 10 transmits an instruction for transport operation to the vehicle 50B such that the vehicle 50B can arrive at the desired arrival position at the designated time at a higher speed than the steady speed. When Tf<Ts and when Tb≥Ts, the transport operation control apparatus 10 transmits an instruction for transport operation to the vehicle 50B such that the vehicle 50B can arrive at the desired arrival position at the designated time at a lower speed than the steady speed.

Figure 6:
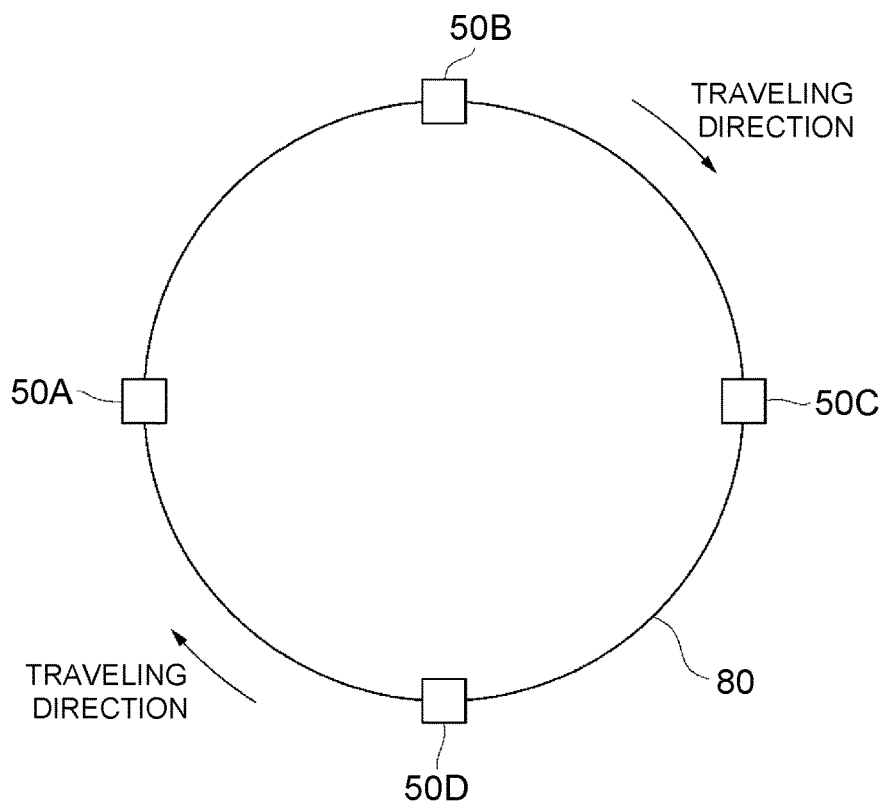
FIG. 6 is an illustrative diagram of the transport operation control method according to the embodiment.

Next, processing of changing one or some of the plurality of vehicles 50 that are traveling on the path 80 will be described with reference to FIGS. 6 to 8. FIG. 6 is an illustrative diagram showing positional relationships between each vehicle 50 before vehicle interchange is performed. In the example, the four vehicles 50 are traveling a circuit along the path 80. The transport operation control apparatus 10 transmits an instruction for transport operation to each vehicle 50 such that the time interval between each two consecutive vehicles 50 becomes equal to the standard vehicle time interval. When a predetermined condition for vehicle interchange is satisfied, the transport operation control apparatus 10 selects any one or more vehicles 50 among the plurality of vehicles 50 as one or more vehicles to be changed. Examples of the condition for vehicle interchange can include a fact that the charged capacity of the on-board battery 54 is less than a threshold value. For example, when the charged capacity of the on-board battery 54 of the vehicle 50A is less than the threshold value, the transport operation control apparatus 10 selects the vehicle 50A as a vehicle to be changed. When vehicle interchange is performed, the transport operation control apparatus 10 selects as many vehicles for replacement as the number of the vehicles to be changed, among a plurality of vehicles 50 that are parked in the depot 90. In the present example, since the vehicle to be changed is the single vehicle 50A, the transport operation control apparatus 10 selects one vehicle 50 as a vehicle for replacement among the plurality of vehicles 50 that are parked in the depot 90. For example, the transport operation control apparatus 10 selects, as a vehicle for replacement, any one vehicle 50 with the on-board battery 54 having a charged capacity that is not less the threshold value, among the plurality of vehicles 50 that are parked in the depot 90.

Figure 7:
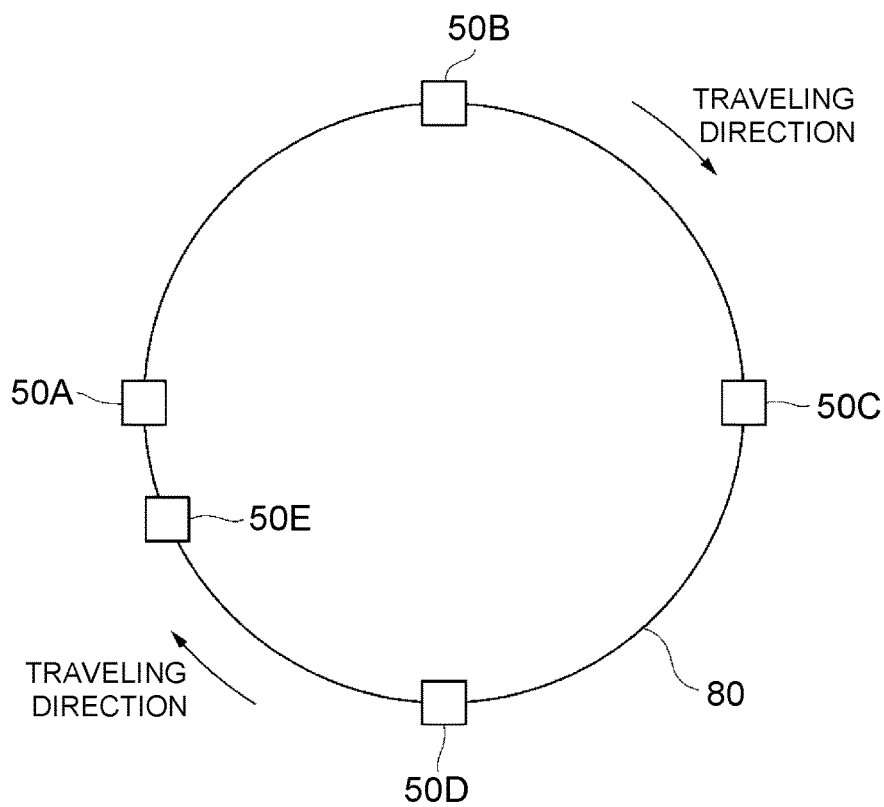
FIG. 7 is an illustrative diagram of the transport operation control method according to the embodiment.

FIG. 7 is an illustrative diagram showing positional relationships between each vehicle 50 immediately after a vehicle 50E for replacement starts traveling on the path 80. The transport operation control apparatus 10 transmits an instruction to the vehicle 50E for replacement such that the vehicle 50E for replacement travels a circuit along the path 80 between the vehicle 50A to be changed and the vehicle 50B traveling ahead of the vehicle 50A to be changed, or between the vehicle 50A to be changed and the vehicle 50D traveling behind the vehicle 50A to be changed. The example shown in FIG. 7 illustrates a case where the vehicle 50E for replacement travels between the vehicle 50A to be changed and the vehicle 50D traveling behind the vehicle 50A to be changed. The vehicle 50E for replacement may come into the path 80 from the waiting section 92 after the vehicle 50A to be changed passes a portion of the path 80 near the exit 95 of the depot 90 and before the vehicle 50D traveling behind the vehicle 50A to be changed passes the portion of the path 80 near the exit 95 of the depot 90, to travel between the vehicle 50A to be changed and the vehicle 50D traveling behind the vehicle 50A to be changed. As a result, a user 61 who has missed the vehicle 50A to be changed can board the vehicle 50E for replacement traveling behind the vehicle 50A to be changed.

Among the plurality of vehicles 50A, 50B, 50C, 50D traveling on the path 80, all the other vehicles 50B, 50C, 50D than the vehicle 50A to be changed are referred to as remaining vehicle. The transport operation control apparatus 10 transmits an instruction for transport operation to each of all the remaining vehicles 50B, 50C, 50D and the vehicle 50E for replacement such that over a time period from when the vehicle 50E for replacement starts traveling on the path 80 until the vehicle 50E for replacement finishes one lap of the path 80, a time interval at which each of all the remaining vehicles 50B, 50C, 50D and the vehicle 50E for replacement passes an arbitrary point on the path 80 becomes appropriately constant. In the present example, the time interval at which each of all the remaining vehicles 50B, 50C, 50D and the vehicle 50E for replacement passes the arbitrary point on the path 80 is the standard vehicle time interval Ts used when the number of vehicles 50 that are traveling on the path 80 is four. Thus, a disturbance in transport operation (for example, speed) of the remaining vehicles 50B, 50C, 50D can be prevented from occurring due to the vehicle 50E for replacement starting traveling on the path 80.

Note that the time interval between the vehicle 50A to be changed and each of the vehicles 50B, 50E traveling ahead of and behind the vehicle 50A to be changed may be a time interval different from the standard vehicle time interval Ts used when the number of vehicles 50 that are traveling on the path 80 is four. The transport operation control apparatus 10 may transmit an instruction for transport operation to the vehicle 50A to be changed such that a time interval at which each of the vehicle 50A to be changed and the vehicles 50B, 50E traveling ahead of and behind the vehicle 50A to be changed passes an arbitrary point on the path 80 becomes approximately constant. In the present example, the time interval at which each of the vehicle 50A to be changed and the vehicles 50B, 50E traveling ahead of and behind the vehicle 50A to be changed passes the arbitrary point on the path 80 is half the standard vehicle time interval Ts used when the number of vehicles 50 that are traveling on the path 80 is four. Thus, even when the vehicle 50A to be changed and the vehicle 50E for replacement temporarily coexist and the plurality of vehicles 50A, 50B, 50C, 50D, 50E are traveling on the path 80, the time intervals between two consecutive vehicles 50 can be made as equal as possible.

Figure 8:
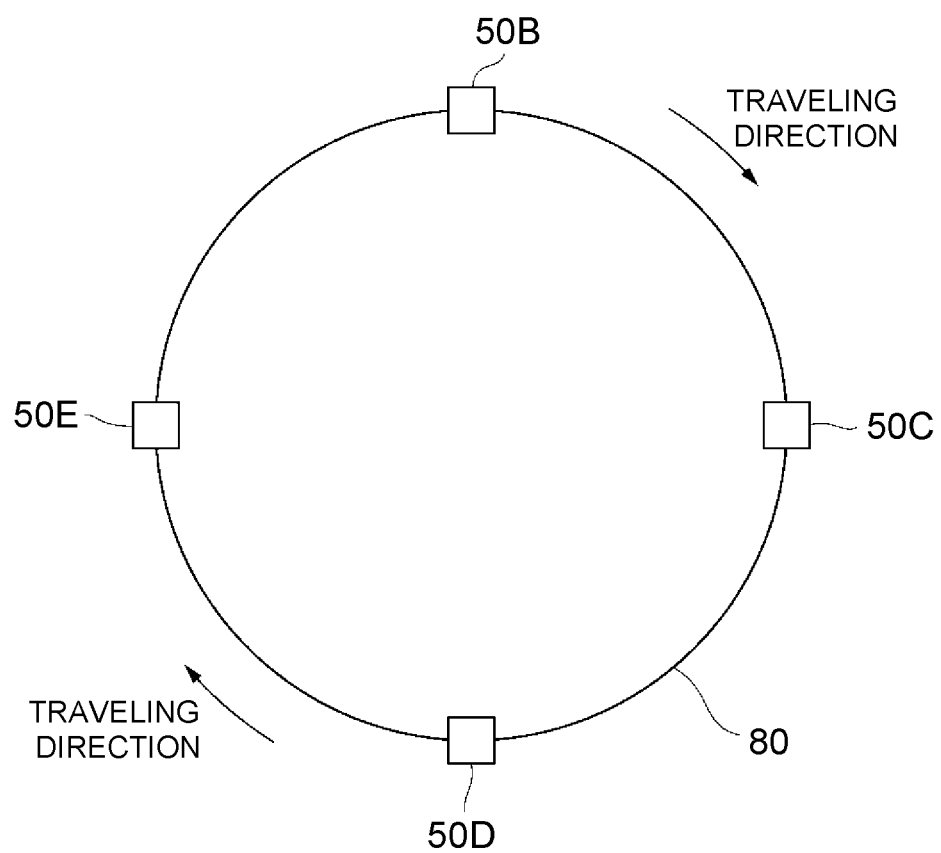
FIG. 8 is an illustrative diagram of the transport operation control method according to the embodiment.

FIG. 8 is an illustrative diagram showing positional relationships between each vehicle 50 immediately after the vehicle 50E for replacement finishes one lap of the path 80 after starting traveling on the path 80. The transport operation control apparatus 10 instructs the vehicle 50A to be changed to leave the path 80 after the vehicle 50E for replacement finishes one lap of the path 80. For example, the vehicle 50A to be changed instructed to leave the path 80 may be parked in the depot 90, and the on-board battery 54 may be charged.

Note that although the processing of changing one vehicle 50 among the plurality of vehicles 50 that are traveling on the path 80 is described in the example shown in FIGS. 6 to 8, two or more vehicles 50 may be changed. For example, assuming that a time interval at which each of all remaining vehicles and all vehicles for replacement passes an arbitrary point on the path 80 is the standard vehicle time interval Ts, and that the number of vehicles to be changed that are traveling between remaining vehicles is M, a time interval between each vehicle to be changed and each of vehicles traveling ahead of and behind the vehicle to be changed may be "standard vehicle time interval Ts×1÷(M+1)". In the example shown in FIGS. 6 to 8, M=1.

Figure 9:
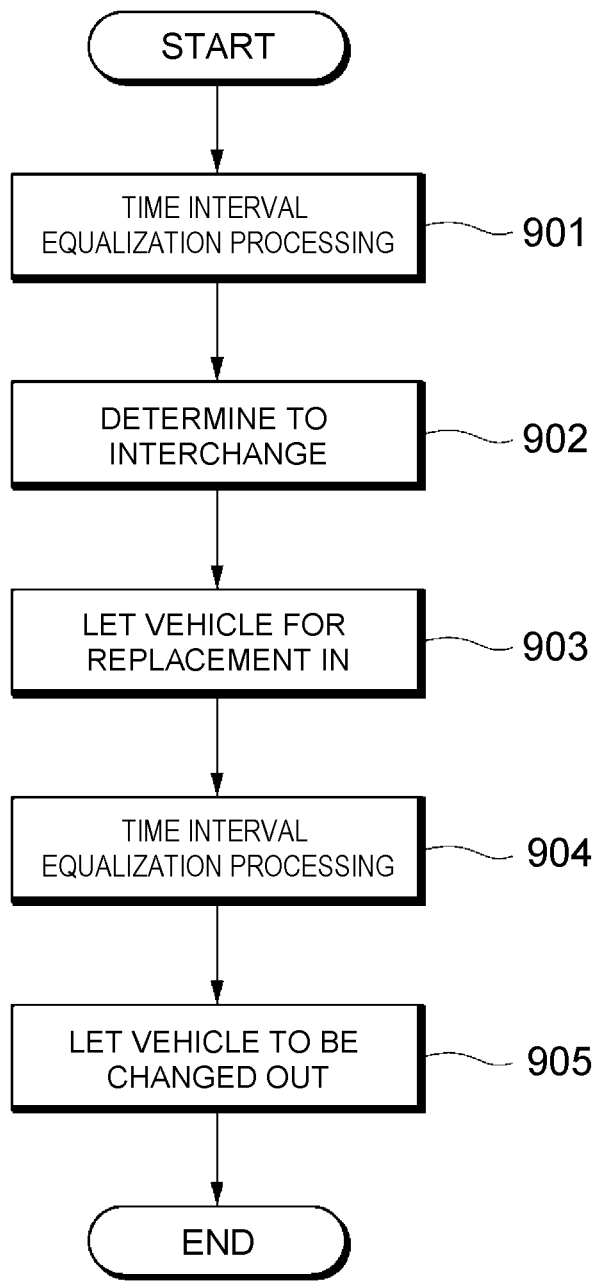
FIG. 9 is a flowchart showing a flow of processing related to the transport operation control method according to the embodiment.

FIG. 9 is a flowchart showing a flow of processing related to the transport operation control method according to the embodiment. The transport operation control method is processed through execution of the transport operation control program 15 by the processor 11. In step 901, the transport operation control apparatus 10 transmits an instruction for transport operation to each of a plurality of vehicles 50 such that a time interval at which each of the plurality of vehicles 50 passes an arbitrary point on the path 80 becomes appropriately constant. In step 902, the transport operation control apparatus 10 selects any one or more vehicles 50 among the plurality of vehicles 50 as one or more vehicles 50A to be changed, and determines to interchange the one or more vehicles 50A to be changed with as many vehicles 50E for replacement as the number of the one or more vehicles 50A to be changed. In step 903, the transport operation control apparatus 10 transmits an instruction to each vehicle 50E for replacement such that the vehicle 50E for replacement travels a circuit along the path 80 between a corresponding one of the one or more vehicles 50A to be changed and the vehicle 50B traveling ahead of the corresponding vehicle 50A to be changed, or between the corresponding vehicle 50A to be changed and the vehicle 50D traveling behind the corresponding vehicle 50A to be changed. In step 904, the transport operation control apparatus 10 transmits an instruction for transport operation to each of all the remaining vehicles 50B, 50C, 50D other than the one or more vehicles 50A to be changed among the plurality of vehicles 50 and each vehicle 50E for replacement such that over a time period from when each vehicle 50E for replacement starts traveling on the path 80 until the vehicle 50E for replacement finishes one lap of the path 80, a time interval at which each of the remaining vehicles 50B, 50C, 50D and the one or more vehicles 50E for replacement passes an arbitrary point on the path 80 becomes approximately constant. In step 904, the transport operation control apparatus 10 may transmit an instruction for transport operation to each vehicle 50A to be changed such that a time interval at which each of the vehicle 50A to be changed and the vehicles 50B, 50E traveling ahead of and behind the vehicle 50A to be changed passes an arbitrary point on the path 80 becomes approximately constant. In step 905, the transport operation control apparatus 10 instructs each vehicle 50A to be changed to leave the path 80 after a corresponding one of the one or more vehicles 50E for replacement finishes the one lap of the path 80.

According to the transport operation control method in the present embodiment, vehicles 50 can be interchanged without causing a disturbance in a time interval at which each of a plurality of vehicles 50 passes an arbitrary point on the path 80.

Note that the transport operation control apparatus 10 functions as means for executing the transport operation control method (steps 901 to 905 in FIG. 9) (a first instructor that executes step 901, a determiner that executes step 902, a second instructor that executes step 903, a third instructor that executes step 904, and a fourth instructor that executes step 905). Such means does not necessarily need to be implemented through cooperation between hardware resources of the transport operation control apparatus 10 and the transport operation control program 15, and may be implemented by using, for example, a hardware resource dedicated to the transport operation control apparatus 10 (for example, an application specific integrated circuit (ASIC), a field programmable gate array (FPGA), or the like).

The embodiment described above is intended to facilitate understating of the present disclosure and should not be construed as limiting an applicable embodiment of the present disclosure. Changes and improvements may be made to the present disclosure without departing from the scope of the present disclosure, and the present disclosure includes its equivalents.

What is claimed is:

1. A transport operation control apparatus that controls transport operation of a plurality of vehicles traveling a circuit along a predetermined path, comprising:
   circuitry configured to:
   transmit an instruction for transport operation to a respective vehicle control apparatus installed in each of the plurality of vehicles such that a time interval at which each of the plurality of vehicles passes an arbitrary point on the path becomes approximately constant;
   select any one or more vehicles among the plurality of vehicles, which satisfy a predetermined condition, as one or more vehicles to be changed and determine to interchange the one or more vehicles to be changed with as many vehicles for replacement as the number of the one or more vehicles to be changed;
   transmit an instruction to the respective vehicle control apparatus installed in each of the one or more vehicles for replacement such that the vehicle for replacement travels a circuit along the path between a corresponding one of the one or more vehicles to be changed and a vehicle traveling ahead of the corresponding vehicle to be changed, or between the corresponding vehicle to he changed and a vehicle traveling behind the corresponding vehicle to be changed;
   transmit an instruction for transport operation to the respective vehicle control apparatus installed in each of all remaining vehicles other than the one or more vehicles to be changed among the plurality of vehicles and each of the one or more vehicles for replacement such that over a time period from when each of the one or more vehicles for replacement starts traveling on the path until the vehicle for replacement finishes one lap of the path, a time interval at which each of e remaining vehicles and the one or more vehicles for replacement passes an arbitrary point on the path becomes approximately constant;
   instruct each of the one or more vehicles to be changed to leave the path after a corresponding one of the one or more vehicles for replacement finishes the one lap of the path; and
   calculate (i) a time interval Tf between a first vehicle and a second vehicle of the plurality of vehicles where the first vehicle is traveling ahead of the second vehicle, (ii) a time interval Ts that is obtained based on a time period required for a vehicle to travel one lap of the path divided by a number of the vehicles that are traveling on the path, and (iii) a time interval Tb between a third vehicle of the plurality of vehicles and the second vehicle where the third vehicle is traveling behind the second vehicle,
   wherein when the time interval Tf is equal to or greater than the time interval Ts, and the time interval Tb is less than the time interval Ts, transmit an instruction for transport operation to the respective vehicle control apparatus installed in the second vehicle such that the second vehicle arrives at a desired arrival position at a designated time at a higher speed than a predetermined operating speed,
   wherein when the time interval If is less than the time interval Is, and the time interval Tb is equal to or greater than the time interval Is. transmit an instruction for transport operation to the respective vehicle control apparatus installed in the second vehicle such that the second vehicle arrives at the desired arrival position at the designated time at a lower speed than the predetermined operating speed, and wherein the respective vehicle control apparatuses are configured to control the respective vehicles based on the respective instructions received from the transport operation control apparatus.

2. The transport operation control apparatus according to claim 1, wherein the circuitry is further configured to:

transmit an instruction for transport operation to each of the one or more vehicles to be changed such that a time interval at which the vehicle to be changed and vehicles traveling ahead of and behind the vehicle to be changed pass an arbitrary point on the path becomes approximately constant.

3. The transport operation control apparatus according to claim 1, wherein the circuitry is further configured to:

determine one or more of the plurality of vehicles to be changed and one or more of the plurality of vehicles for replacement based on a state-of-charge of an on-board battery mounted in each of the plurality of vehicles.

4. A transport operation control method implemented via circuitry of a transport operation control apparatus, the method comprising:

controlling transport operation of a plurality of vehicles traveling a circuit along a predetermined path, transmitting an instruction for transport operation to a respective vehicle control apparatus installed in each vehicle such that a time interval at which each of the plurality of vehicles passes an arbitrary point on the path becomes approximately constant;

selecting any one or more vehicles among the plurality of vehicles as one or more vehicles to be changed and determining to interchange the one or more vehicles to be changed with as many vehicles for replacement as the number of the one or more vehicles to be changed;

transmitting an instruction to the respective vehicle control apparatus installed in each of the one or more vehicles for replacement such that the vehicle for replacement travels a circuit along the path between a corresponding one of the one or more vehicles to be changed and a vehicle traveling ahead of the corresponding vehicle to be changed, or between the corresponding vehicle to be changed and a vehicle traveling behind the corresponding vehicle to be changed;

transmitting an instruction for transport operation to the respective vehicle control apparatus installed in each of all remaining vehicles other than the one or more vehicles to be changed among the plurality of vehicles and each of the one or more vehicles for replacement such that over a time period from when each of the one or more vehicles for replacement starts traveling on the path until the vehicle for replacement finishes one lap of the path, a time interval at which each of all the remaining vehicles and the one or more vehicles for replacement passes an arbitrary point on the path becomes approximately constant;

instructing each of the one or more vehicles to be changed to leave the path after a corresponding one of the one or more vehicles for replacement finishes the one lap of the path; and calculating a time interval Tf between a first vehicle and a second vehicle of the plurality of vehicles where the first vehicle is traveling ahead of the second vehicle, (ii) a time interval Ts that is obtained based on a time period required for a vehicle to travel one lap of the path divided by a number of the vehicles that are traveling on the path, and (iii) a time interval Tb between a third vehicle of the plurality of vehicles and the second vehicle where the third vehicle is traveling behind the second vehicle.

wherein when the time interval Tf is equal to or greater than the time interval Ts, and the time interval Tb is less than the time interval Ts, transmitting an instruction for transport operation to the respective vehicle control apparatus installed in the second vehicle such that the second vehicle arrives at a desired arrival position at a designated time at a higher speed than a predetermined operating speed, wherein when the time interval Tf is less than the time interval Ts, and the time interval Tb is equal to or greater than the time interval Ts transmitting an instruction for transport operation to the respective vehicle control apparatus installed in the second vehicle such that the second vehicle arrives at the desired arrival position at the designated time at a lower speed than the predetermined operating speed, and wherein the respective vehicle control apparatuses are configured to control the respective vehicles based on the respective instructions received from the transport operation control apparatus.

5. A system including a vehicle control apparatus installed in each of a plurality of vehicles and a transport operation control apparatus that controls transport operation of the plurality of vehicles traveling a circuit along a predetermined path, comprising:

first circuitry of the transport operation control apparatus configured to:

transmit an instruction for transport operation to the respective vehicle control apparatus installed in each of the plurality of vehicles such that a time interval at which each of the plurality of vehicles passes an arbitrary point on the path becomes approximately constant;

select any one or more vehicles among the plurality of vehicles, which satisfy a predetermined condition, as one or more vehicles to be changed and determine to interchange the one or more vehicles to be changed with as many vehicles for replacement as the number of the one or more vehicles to be changed;

transmit an instruction to the respective vehicle control apparatus installed in each of the one or more vehicles for replacement such that the vehicle for replacement travels a circuit along the path between a corresponding one of the one or more vehicles to be changed and a vehicle traveling ahead of the corresponding vehicle to be changed, or between the corresponding vehicle to be changed and a vehicle traveling behind the corresponding vehicle to be changed;

transmit an instruction for transport operation to the respective vehicle control apparatus installed in each of all remaining vehicles other than the one or more vehicles to be changed among the plurality of vehicles and each of the one or more vehicles for replacement such that over a time period from when each of the one or more vehicles for replacement starts traveling on the path until the vehicle for replacement finishes one lap of the path, a time interval at which each of all the remaining vehicles and the one or more vehicles for replacement passes an arbitrary point on the path becomes approximately constant;

instruct each of the one or more vehicles to be changed to leave the path after a corresponding one of the one or more vehicles for replacement finishes the one lap of the path; and calculate (i) a time interval Tf between a first vehicle and a second vehicle of the plurality of vehicles where the first vehicle is traveling ahead of the second vehicle, (ii) a time interval Ts that is obtained based on a time period required for a vehicle to travel one lap of the path divided by a number of the vehicles that are traveling on the path, and (iii) a time interval Tb between a third vehicle of the plurality of vehicles and the second vehicle where the third vehicle is traveling behind the second vehicle, wherein when the time interval If is equal to or greater than the time interval Ts, and the time interval Tb is less than the time interval Ts, transmit an instruction for transport operation to the respective vehicle control apparatus installed in the second vehicle such that the second vehicle arrives at a desired arrival position at a designated time at a higher speed than a predetermined operating speed, and wherein when the time interval Tf is less than the time interval Ts, and the time interval Tb is equal to or greater than the time interval Ts, transmit an instruction for transport operations to the respective vehicle control apparatus installed in the second vehicle such that the second vehicle arrives at the desired arrival position at the designated time at a lower speed than the predetermined operating speed; and second circuitry of the respective vehicle control apparatus of each of the respective vehicles configured to:

control the respective vehicles based on the respective instructions received from the first circuitry of the transport operation control apparatus.

6. A vehicle control apparatus installed in at least one of a plurality of vehicles that receives instructions from a transport operation control apparatus to control transport operation of the at least one of the plurality of vehicles traveling a circuit along a predetermined path, comprising:

circuitry configured to:

receive an instruction for transport operation from the transport operation control apparatus such that a time interval at which the at least one of the plurality of vehicles passes an arbitrary point on the path becomes approximately constant;

wherein the transport operation control apparatus is configured to select any one or more of the at least one of the plurality of vehicles, which satisfy a predetermined condition, as one or more vehicles to be changed and determine to interchange the one or more vehicles to be changed with as many vehicles for replacement as the number of the one or more vehicles to be changed;

receive an instruction from the transport operation control apparatus for replacement such that the vehicle for replacement travels a circuit along the path between a corresponding one of the one or more vehicles to he changed and a vehicle traveling ahead of the corresponding vehicle to be changed, or between the corresponding vehicle to be changed and a vehicle traveling behind the corresponding vehicle to be changed;

receive an instruction for transport operation at each of all remaining vehicles other than the one or more vehicles to be changed among the plurality of vehicles and each of the one or more vehicles for replacement such that over a time period from when each of the one or more vehicles for replacement starts traveling on the path until the vehicle for replacement finishes one lap of the path, a time interval at which each of all the remaining vehicles and the one or more vehicles for replacement passes an arbitrary point on the path becomes approximately constant;

receive an instruction at each of the one or more vehicles to be changed to leave the path after a corresponding one of the one or more vehicles for replacement finishes the one lap of the path; and wherein the transport operation control apparatus is configured to calculate (i) a time interval Tf between a first vehicle and a second vehicle of the plurality of vehicles where the first vehicle is traveling ahead of the second vehicle, (ii) a time interval Ts that is obtained based on a time period required for a vehicle to travel one lap of the path divided by a number of the vehicles that are traveling on the path, and (iii) a time interval Tb between a third vehicle of the plurality of vehicles and the second vehicle where the third vehicle is traveling behind the second vehicle, wherein when the time interval if is equal to or greater than the time interval Ts, and the time interval Tb is less than the time interval Ts, receive an instruction for transport operation from the transport operation control apparatus at the respective vehicle control apparatus installed in the second vehicle such that the second vehicle arrives a desired arrival position at a designated time at a higher speed than a predetermined operating speed, wherein when the time interval Tf is less than the time interval Ts, and the time interval Tb is equal to or greater than the time interval Ts, receive an instruction for transport operation from the transport operation control apparatus at the respective vehicle control apparatus installed in the second vehicle such that the second vehicle arrives at the desired arrival position at the designated time at a lower speed than the predetermined operating speed, and control the respective vehicles based on the respective instructions received from the transport operation control apparatus.

* * * * *